Patented July 25, 1933

1,919,612

UNITED STATES PATENT OFFICE

MAX BLOCK, OF KEW GARDENS, NEW YORK, AND OSWALD FREUND, OF BLOOMFIELD, NEW JERSEY

YEAST PRODUCT AND METHOD OF MAKING THE SAME

No Drawing. Application filed May 26, 1931. Serial No. 540,194.

This invention relates to an improved yeast product and its process of manufacture.

The object of the invention is to provide a yeast product which, in addition to its well known nutrient properties and vitamin content, will also possess definite therapeutic properties not possessed by ordinary yeast. The therapeutic properties which we impart to the yeast by the process of manufacturing constituting our invention are obtained by modifying the nature of the yeast itself as distinguished from incorporating with it some compound having the therapeutic properties desired.

Primarily our invention consists of a yeast having all the usual properties of yeast and which, in addition, possesses the therapeutic properties of senna, aloes, cascara, or like drug, without, however, possessing any of the identifying characteristics of the drug except its laxative properties which may be imparted to the yeast in varying degrees, as will hereinafter be more fully explained.

Our invention is based on the discovery that yeast has the capacity of assimilating from certain drugs, particularly those mentioned herein, the property of the drug which renders it laxative when the medium on which the yeast is grown has properly associated with it the particular drug in question. Just what actual material component of the drug is absorbed by the yeast we have not yet determined, nor can we be certain that the yeast actually assimilates any material substance from the drug added to the solution in which the yeast is grown, as it is possible that the presence of the drug in the nutrient solution stimulates the growth of the yeast in such manner as to create in the yeast substance itself laxative properties similar to those possessed by the drug. We are of the opinion, however, that the yeast cells in their growth actually extract from the drug in the nutrient solution the essential oil or other substance which gives to the yeast its therapeutic value.

The drug may be fed to the yeast in different ways at different stages in the growth of the yeast. We prefer, however, to follow the procedure hereinafter described as best adapted for the growth of yeast on a commercial scale, and also as best adapted for regulation so as to impart to the yeast any desired degree of laxative effect.

In this preferred commercial practice of producing our improved yeast, we preferably begin with the washed yeast as it is taken from the fermenter after being separated from the fermented beer or wort, and before being taken to the filter press. Yeast in this condition is sufficiently liquid for our purpose, and if desired, ordinary bakers' compressed yeast may be used by dissolving it in water so as to have about the consistency of yeast at the above mentioned stages of its manufacture.

The liquid yeast which may be described as a completely matured yeast, is introduced into a fermenter containing a yeast nutrient solution which under aeration can be easily fermented by the yeast. An ordinary sugar solution of very dilute concentration, for example, about one degree Balling, may be used either with or without inorganic yeast nutrient salts, or a clarified molasses solution such as generally employed in the commercial production of yeast, may be used. Preferably the wort will contain yeast nutrient salts and also grain mash in order that the yeast may have, in addition to the properties imparted by virtue of our invention, the usual high vitamin and protein content. As soon as fermentation begins, which is accompanied by an assimilation by the yeast of the nutrient solution, there is added to the content of the wort in small increments a further quantity of the nutrient solution in which there is dissolved an extract of the particular laxative whose properties it is desired to impart to the yeast.

The extract is preferably prepared from the selected laxative substance in the form of herbs, roots or the like, as it may be obtained on the market, by percolation, infusion or decoction with water or with water and a small quantity of alcohol, with or without steam pressure, as may be desired. A clear filtrate of the extract is made, and this filtrate is mixed with a small quantity of the nutrient solution. This mixture of the nutrient solution and the extract is added to the fermenter from time to time to replace the material as it may be fermented by the action of the yeast and assimilated by the yeast growth. During this period the fermenter is subjected to the usual aeration and after three to four hours' treatment the yeast will have acquired the laxative properties of the drug used in making the extract.

The degree of laxative effect may be widely varied by varying the concentration of the extract added to the nutrient solution. If, however, the nutrient solution contains the laxative extract in excessive concentration the cell activity of the yeast plant is impaired, which not only adversely affects the quality of the yeast, but prevents the absorption to the yeast of the laxative extract to the same degree as can be obtained by using a lesser amount of the extract in the nutrient solution. Also, there is a limit to the degree of laxative properties which may be imparted to the yeast by prolonging the time of feeding. That is to say, when the yeast has absorbed the laxative properties from the nutrient solution to the extent permissible without adversely affecting its cell growth, the further absorption of the laxative extract proceeds at a very slow rate, thereby limiting the concentration of the laxative which may be obtained in ordinary commercial practice.

Laxative properties in a lesser degree may be imparted to the yeast by using a less concentrated extract of shortening the period of treatment, or both. In practice, yeasts possessing laxative properties of different degrees will be produced so that one desiring to take yeast for its protein and vitamin content in the quantities usually prescribed for that purpose may select a product having any desired degree of laxative effect corresponding roughly with the different dosages customarily prescribed for the particular drug employed.

After the above described treatment of yeast has been carried on for the desired length of time, the yeast is separated from its solution, washed with water and pressed through a filter press and then prepared in any of the various forms in which yeast is placed upon the market. The yeast may be dried with an air current in the usual manner, so as to preserve the life of the yeast cells, or the yeast may be dried in a manner to destroy the fermentive properties of the yeast without impairing the laxative properties imparted to it. The yeast product is entirely free from the usual bitter or other characteristic taste of the particular drug employed. In fact, the yeast is difficult to distinguish by any test of which we are aware, from corresponding yeast grown in a solution containing no laxative extract, and the only way in which our improved yeast can be distinguished from ordinary yeast in the same form is in its therapeutic effect, which will substantially correspond to the effect produced by the drug itself administered in a corresponding amount.

We have found that the use in the nutrient solution of any of the so-called catalysts employed in some instances to accelerate the growth of the yeast, such, for example, as potassium bromate, has also the effect of intensifying the assimilation by the yeast of the therapeutic properties of the drug extract.

In addition to the particular drugs mentioned above, we have used with corresponding results rhubarb and jallap and we believe that other drugs having like properties may be employed with like results.

We claim:

1. A process for the production of yeast with laxative properties which comprises growing yeast in a nutrient solution containing a sufficient amount of an extract of a laxative drug of the type of senna, aloes, cascara, jallap and rhubarb until appreciable laxative properties have been imparted to and assimilated by the yeast.

2. A process for the production of yeast having laxative properties which comprises adding yeast to a nutrient solution containing a sufficient amount of an extract of a laxative drug of the type of senna, aloes, cascara, jallap and rhubarb, allowing the yeast to grow in said solution for a period of time sufficient for the yeast to have imparted thereto appreciable laxative properties, subjecting the solution to aeration during at least a portion of the period in which the yeast is growing therein, and thereafter separating the yeast from said solution.

3. Yeast produced by the method set forth in claim 1, the taste of the drug assimilated by the resultant yeast being eliminated or at least modified.

MAX BLOCK.
OSWALD FREUND.